No. 869,456. PATENTED OCT. 29, 1907.
S. OTIS.
MOTOR RAILWAY TRUCK.
APPLICATION FILED NOV. 7, 1906.

2 SHEETS—SHEET 1.

Witnesses:
Inventor:
Spencer Otis,
By Thomas F. Sheridan,
Atty.

No. 869,456. PATENTED OCT. 29, 1907.
S. OTIS.
MOTOR RAILWAY TRUCK.
APPLICATION FILED NOV. 7, 1906.

2 SHEETS—SHEET 2.

Witnesses:
Chas. E. Gaylord.
John Enders.

Inventor:
Spencer Otis,
By Thomas F. Sheridan,
Atty.

UNITED STATES PATENT OFFICE.

SPENCER OTIS, OF CHICAGO, ILLINOIS.

MOTOR RAILWAY-TRUCK.

No. 869,456.  Specification of Letters Patent.  Patented Oct. 29, 1907.

Application filed November 7, 1906. Serial No. 342,376.

*To all whom it may concern:*

Be it known that I, SPENCER OTIS, a citizen of the United States, residing at Chicago, in the county of Cook and State of Illinois, have invented certain new and useful Improvements in Motor Railway-Trucks, of which the following is a specification.

My invention relates to motor railway trucks; and has for its object to provide a truck in which the main driving motor may be operated continually in the same direction of rotation, while the drive wheels of the truck may have their direction of rotation reversed.

Other objects of my invention are the provision of simple and durable mechanism for carrying out the above purpose, and such as may be economical of manufacture and simple to assemble.

My invention is illustrated in the accompanying drawings, in which—

Figure 1:
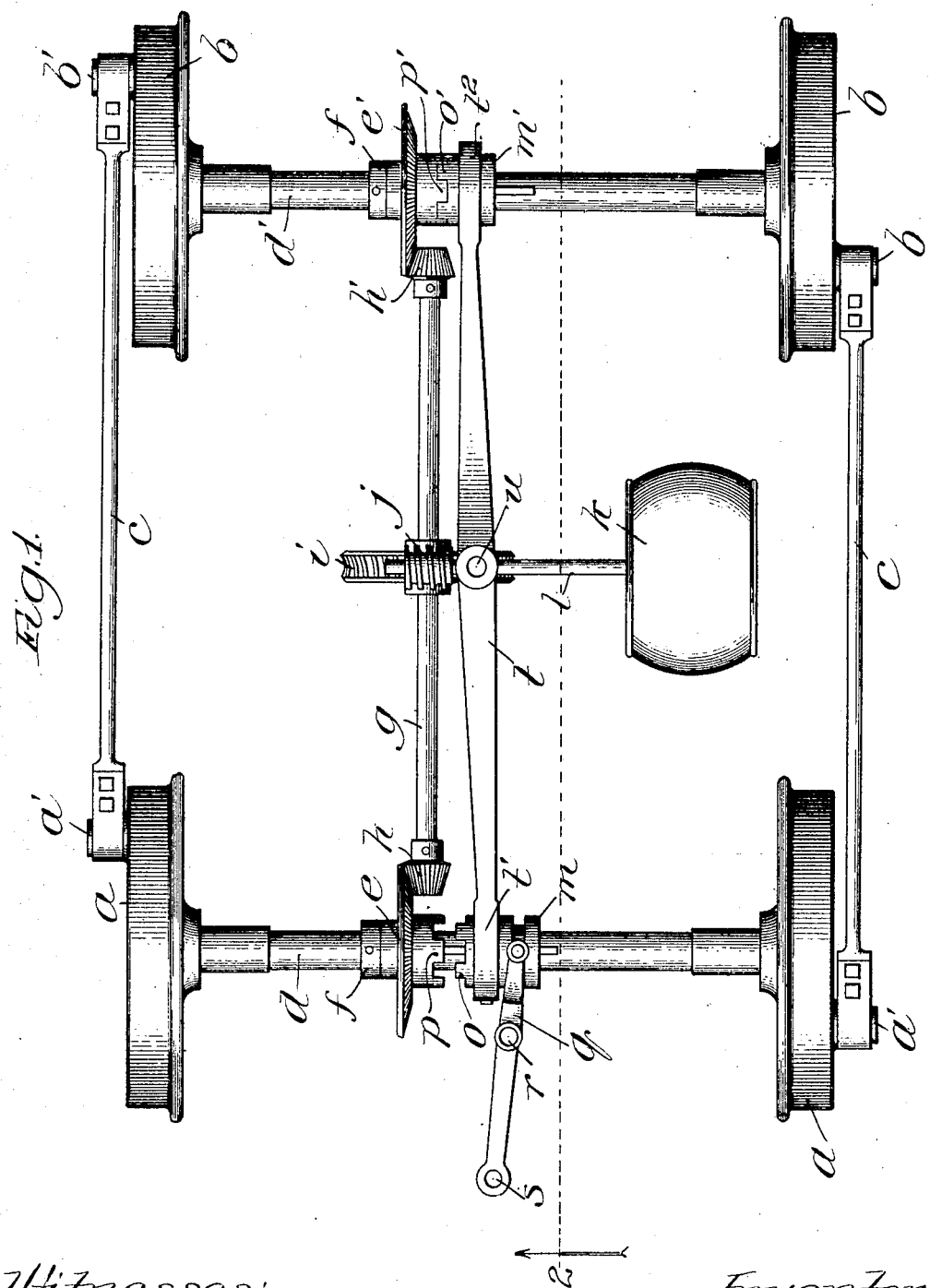
Figure 2:
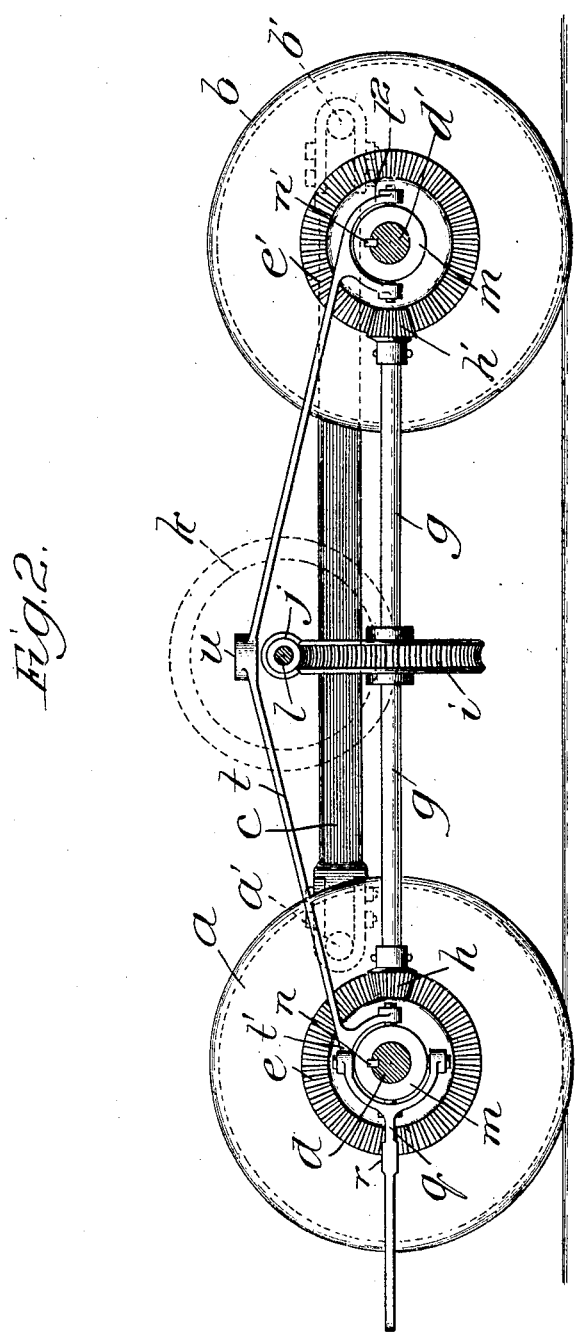

Figure 1 is a plan view as applied to a four-wheel railroad truck; and Fig. 2 a section on the line 2 of Fig. 1.

Referring to the drawings, I show the wheels $a$ and $b$ connected by means of the crank rods $c$, these rods being connected to crank pins $a'$ and $b'$ in such manner that the wheels upon one axle may not be rotated without the wheels upon the other axle following in the same direction of rotation. By so connecting the wheels both the pins and wheels become drivers, as will be readily understood.

Upon the axle $d$ of the wheels $a$ I provide the loose bevel gear wheel $e$, held in position by collars secured to the shaft, one of which is shown as $f$. Upon the axle $d'$ connecting wheels $b$, I similarly provide the gear $e'$ and collar $f'$. The shaft $g$ is provided at one end with the bevel gear wheel $h$ and at the other end with the bevel gear wheel $h'$ meshing, respectively, with gears $e$ and $e'$, and is provided at its middle point with the comparatively large gear $i$ which is driven by means of the worm $j$ by any suitable source $k$ through the shaft $l$. Upon each of the axles $d$ and $d'$ I also provide slidable clutch blocks $m$ and $m'$ keyed to the shaft by keys $n$ and $n'$ in such manner that the clutch blocks may be slid along the shaft but cannot rotate thereon. These clutch blocks are provided with teeth $o$ and $o'$ adapted to mesh between the teeth $p$ and $p'$ upon the hubs of the loose gears $e$ and $e'$. The clutch block $m$ is thrown into and out of registry with the teeth of gear $e$ by means of the lever $q$, which is pivoted at $r$ and may be operated by any desired means, which may be attached at the point $s$. The lever $t$ is secured at one end to the clutch block $m$ and at the other end to the clutch block $m'$ in such manner that the clutch blocks are free to rotate within the portions $t'$ and $t^2$ which encircle a portion of the clutch blocks $m$ and $m'$ and preferably engage rings which are rotatable in slots in the clutch blocks. The lever $t$ is pivoted at $u$ in such manner that when the clutch block $m$ is moved into engagement with the teeth of gear $e$ the clutch-block $m'$ will simultaneously be moved out of engagement with the teeth of gear $e'$.

It will be observed that by this arrangement the simple movement of the lever $q$ will move one of the clutch blocks into and the other out of engagement with the loose gears and thereby, inasmuch as these gears are rotated in opposite directions by the prime mover $k$, will reverse the direction of rotation of the car wheels $a$ and $b$. The prime mover may be a motor of any preferred type, such as a turbine or electric motor.

It is to be understood that while I have herein shown and described my invention with relation to certain details, that I do not wish to be unduly limited thereto, many substitutions being possible without departing from the spirit or scope of my invention.

I claim:

1. In a railway car truck, the combination of a pair of axles, wheels secured to the axles, driving rods connecting the wheels, a loose gear on each of the axles, means engaging the gears for rotating them in opposite directions, a clutch member secured to each axle to rotate therewith and longitudinally movable on the axles, and means for moving the clutch blocks to throw them into and out of engagement with the gears.

2. In a railway car truck, the combination of a pair of parallel axles, wheels secured thereto, a driving rod connecting the wheels, a loose gear on each axle, a prime mover, means for rotating the gears in opposite directions thereby, and means to secure either of said gears to its axle whereby the truck may be run in either direction using all its wheels as traction wheels.

3. In a truck, the combination of a pair of axles, drive wheels secured to such axles, crank pins on the drive wheels, a driving rod connected between the crank pins, a loose gear on each of the axles, means engaging the gears for rotating them in opposite directions, a clutch block secured to each axle to rotate therewith and adjacent the loose gears and longitudinally slidable on such axles, a lever connecting said blocks and pivoted between them, and means for operating the lever whereby either of the clutch blocks may be rotatively secured to its loose gear and the other simultaneously released from its loose gear whereby the truck may be driven in either direction.

4. In a truck, the combination of a pair of axles, drive wheels secured to such axles, crank pins on the drive wheels, a driving rod between the crank pins, a loose bevel gear on each of the axles, a shaft mounted at right angles to each of the axles and carrying a beveled gear at each end engaging with such loose gears, a prime mover for rotating the shaft in one direction, a clutch block rotatively secured to each axle and longitudinally slidable into and out of mesh with notches upon the loose gears, a lever connecting the clutch blocks and pivoted between them, and means for operating the lever whereby either of the clutch blocks may be slid into mesh with its loose gear and the other simultaneously slid out of mesh with its loose gear whereby the truck may be driven in either direction.

SPENCER OTIS.

Witnesses:
 CHARLES F. FITTS,
 W. T. JONES.